N. H. Gillet.

Reflector.

No. 1,918. Reissued Mar. 28, 1865.

Witnesses:
Frederick Curtis
H. E. Fisher.

Inventor:
Noah H. Gillet.

N. PETERS, PHOTO-LITHOGRAPHER, WASHINGTON, D. C.

UNITED STATES PATENT OFFICE.

NOAH H. GILLET, OF NEW YORK, N. Y.

RENDERING ARTIFICIAL LIGHT THE SAME AS DAYLIGHT.

Specification forming part of Letters Patent No. 43,581, dated July 19, 1864; Reissue No. 1,918, dated March 28, 1865.

*To all whom it may concern.*

Be it known that I, NOAH H. GILLET, of the city and State of New York, have invented or discovered a certain means for rendering artificial light analogous to or essentially the same in color as daylight or sunlight; and I do hereby declare the following to be a full, clear, and exact description of the nature of the said discovery and the mode of its application to useful purposes.

It is well known that nearly, if not all, artificial lights, especially those produced from combustible matters, when inflamed or on fire, possess more or less of a reddish tint, that seriously interferes with the distinguishing of colors by such lights. Greens, blues, yellows, and their combinations often cannot be distinguished or are more or less impaired by artificial light; hence paintings cannot be colored with reliability, except by daylight, and when viewed by artificial light the harmony and beauty of color are either lost or materially affected. Besides, persons who have to write by artificial lights, particularly gaslight, find their eyes to tire and become weak by the action of the red rays from such lights.

I have discovered that a light or sky blue glass introduced before an artificial light renders that light white, or approximately so, and apparently colorless, and at the same time the blue of the glass becomes invisible; also, that an artificial light shining through such intervening glass and falling on colored bodies will cause the colors thereof to have the same appearance as they do under the illumination of daylight, and will show the colors in the same; and, also, that the rays of light proceeding from such glass do not cause the eye to tire or become weak any more than ordinary daylight. The blue glass may be obtained by the ordinary staining operation, or it may be painted with transparent colors, the former being preferable. As the intensity of the light is somewhat lessened by the glass, a reflector should be employed. It may be placed behind the light or may be otherwise properly arranged, and the blued glass may be at the extremity of the reflector or at any desired point, so long as the light passes through the same before reaching the objects viewed.

Figure 2:
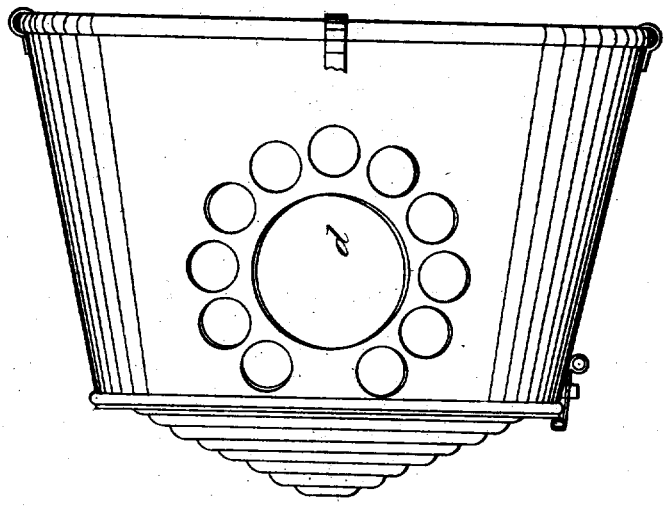
Figure 1:
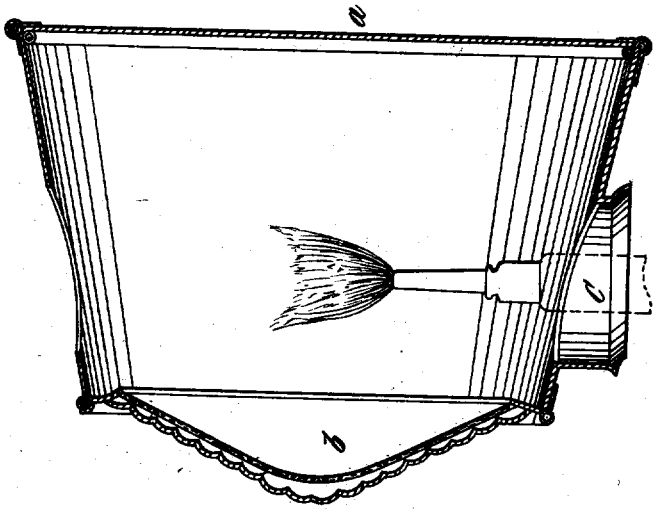

In the drawings, Figure 1 is a vertical section with my invention of a blue glass, *a*, applied to a reflector, *b*, so that the light from a flame, when placed between the reflector and the glass, as shown at *x*, may be rendered white as it shines through the glass. Fig. 2 is a plan of the said reflector, showing the opening *d* for the gases and heated air arising from the light.

The shade of blue may be slightly varied according to the intensity of the light; but the nearer the same is to sky-blue the more efficient I find it to be in neutralizing the red rays of the artificial light.

The object of using a reflector with the blue glass is to increase the light thrown upon the glass in order to compensate for the loss of light occasioned by the glass.

I am aware that it is not new to apply a reflector to a flame, and therefore I do not claim such in the abstract; but as it has never been used in connection with the blue glass and the artificial light in the manner and for the purpose which I employ it, I deem such use as part of my invention.

What I claim, and desire to secure by Letters Patent, is—

Rendering artificial light the same color or effect as daylight by an intervening glass of the color specified, and in combination therewith the employment of a reflector, substantially as specified.

N. H. GILLET.

Witnesses:
R. H. EDDY,
F. P. HALE, Jr.